J. R. McAlister,
Boring Hubs.
N° 59,245.            Patented Oct. 30, 1866.
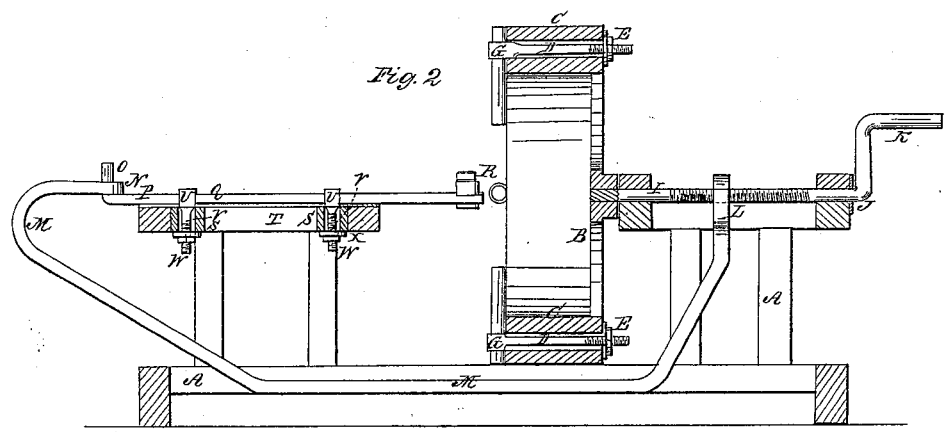
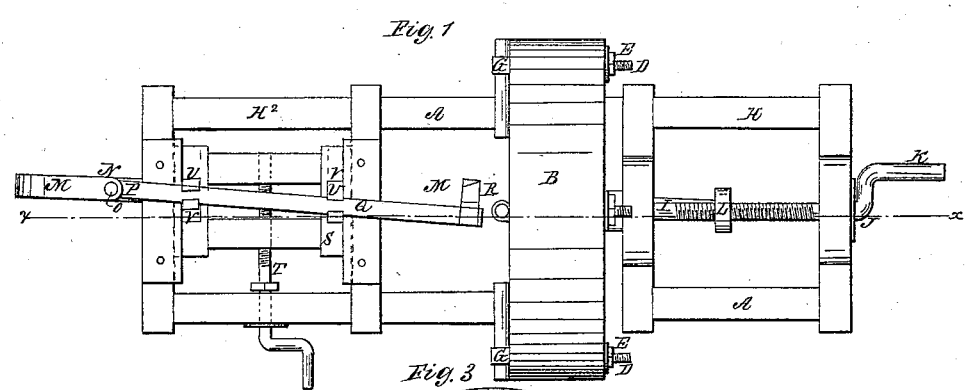
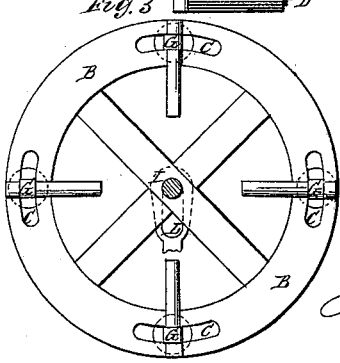
Witnesses:            Inventor:

UNITED STATES PATENT OFFICE.

J. R. McALISTER, OF RICHVILLE, NEW YORK.

IMPROVEMENT IN MACHINES FOR BORING WAGON-HUBS.

Specification forming part of Letters Patent No. 59,245, dated October 30, 1866.

*To all whom it may concern:*

Be it known that I, J. R. McALISTER, of Richville, in the county of St. Lawrence and State of New York, have invented new and useful Improvements in Hub-Boring Machines; and I do hereby declare that the following is a full, clear, and exact description thereof, which will enable others skilled in the art to make and use the same, reference being had to the accompanying drawings, forming part of this specification.

The present invention relates to improvements in hub-boring machines of that class used for the boring or reaming out of the wheel-hubs of carriages, wagons, or other vehicles to prepare them for the reception of the axle-boxes; and it consists in a novel manner of hanging the revolving cutter head or blade, whereby it can be adjusted to any diameter and taper which it is desired the bore of the wheel-hubs should have to receive the axle-boxes, as will be obvious from the following detail description thereof, reference being had to the accompanying plate of drawings, in which—

Figure 1 is a plan or top view of the machine; Fig. 2, a longitudinal vertical section taken in the plane of the line $x\ x$, Fig. 2; and Fig. 3, a front view and elevation of the chuck or holder for the wheel-hub while being bored or reamed out.

Similar letters of reference indicate like parts.

A in the drawings represents the supporting frame-work of the machine; B, the chuck or holder for the wheel-hub which is to be bored or reamed out. Through the thickness of the holder or chuck B, near its periphery, are made a series of slots, C, through each of which passes a bolt, D, having nuts E upon their rear ends and eyes or rings G at their ends projecting from the face of the chuck, suitable to receive the spokes of the wheel-hub when to be attached to the chuck for being bored or reamed out. This chuck B is placed in a vertical position between the two end portions H H² of the frame-work A, and by its center horizontal shaft, I, is hung in suitable bearings of the end portion H, which shaft I has upon its outer end, J, a crank-handle, K, for convenience in turning it. This shaft I, between its two bearing-points, has a spiral screw-thread, $a$, formed around it, on which is hung by its slotted end L a bent or curved arm, M, passing down and under the chuck to the opposite end of the machine, where, by its eye N, it is hung upon the pin or stud O, fixed in the outer end, P, of a horizontal bar, Q, which at its inner end carries the cutter or knife-blade R for reaming or boring out the wheel-hub. This bar Q is secured upon the upper side of a horizontal sliding frame, S, arranged so as to move forward and backward thereon in a direction across the plane of movement of the chuck B, according as the screw-rod T, by its handle U, entering and passing through such frame, is turned either to the right or left, as the case may be. This bar Q passes through two clasps, U, one at each end of the sliding frame, which clasps are arranged in slots V of such frame, and by means of a nut, X, upon the lower ends of their bolts W, can be secured and adjusted in any position desired in such slots.

In the use of the lathe above described the wheel-hub which is to be bored or reamed out is placed in the chuck-wheel B, and there centered, when, having adjusted the cutter or knife-blade arm or bar Q to the point to produce the desired taper in the bore of the hub by means of its sliding and adjustable clasps U, then turn the crank-handle K in the proper direction to feed and move the said cutter-blade up to its work through the connecting parts explained, which being completed, the tool is then withdrawn from the hub by reversing the motion of the said crank-handle.

It may be here observed that the tool or cutter may be removed without reversing the motion by simply raising the slotted end of the arm M from the threaded shaft I sufficiently to disengage the two, when the cutter-bar or holder is free to be withdrawn, as is obvious without any further explanation.

I claim as new and desire to secure by Letters Patent—

The boring-machine herein described, the same consisting of the chuck B, shaft I, curved arm M, having slotted end L and eye N, knife-carrying bar Q, sliding frame S, adjustable clasps U, arranged and operating substantially as described, for the purpose specified.

J. R. McALISTER.

Witnesses:
 JOHN R. CLARK,
 CHARLES R. WALKER.